C. W. SIRCH.
PROCESS FOR PURIFYING LIQUIDS.
APPLICATION FILED MAY 10, 1920.

1,416,899.

Patented May 23, 1922.
2 SHEETS—SHEET 1.

Fig. 1.

INVENTOR
Charles W. Sirch

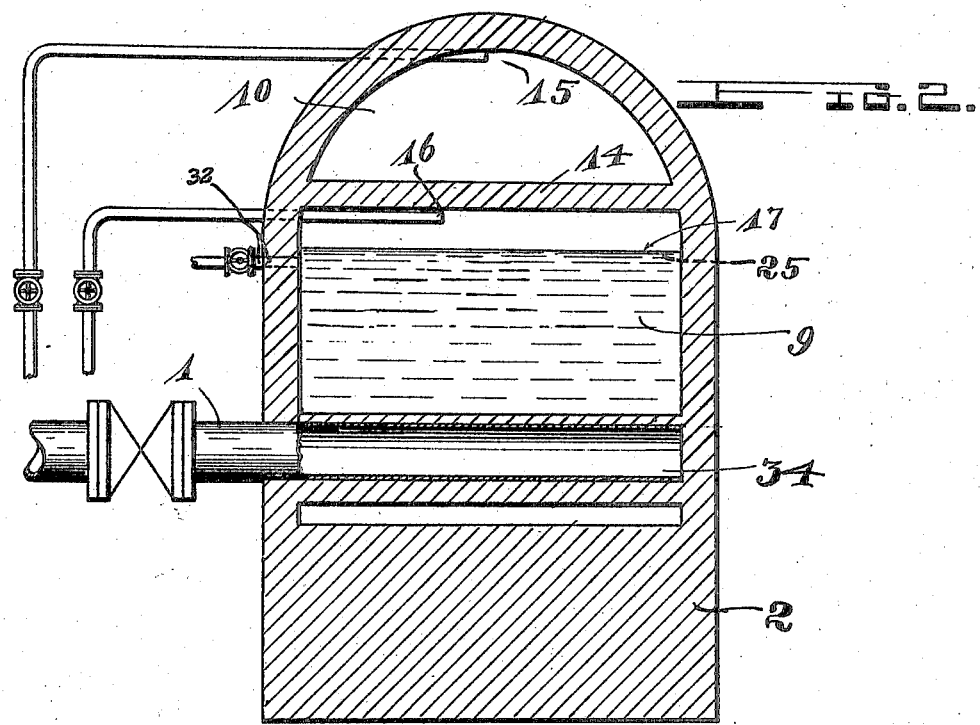
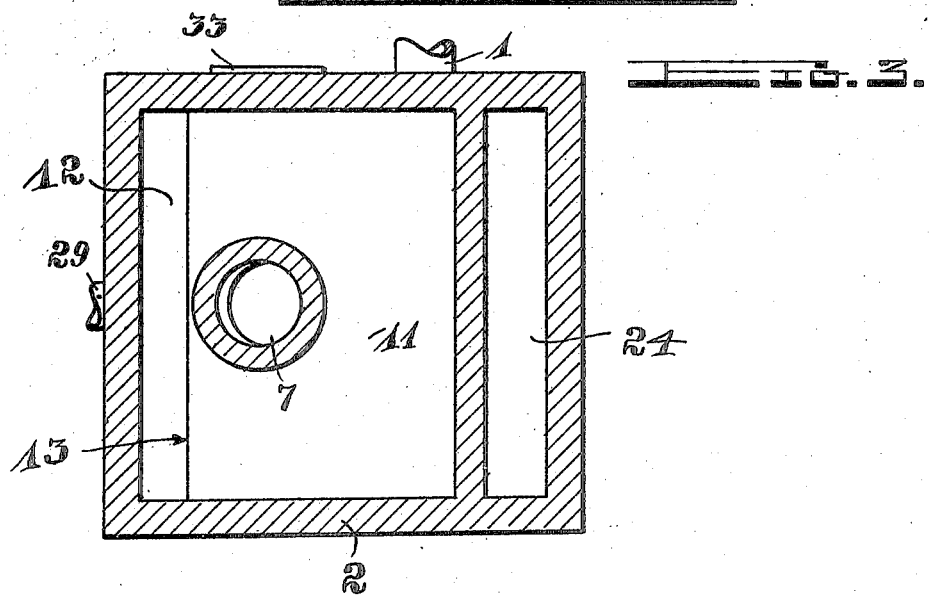

UNITED STATES PATENT OFFICE.

CHARLES W. SIRCH, OF LOS ANGELES, CALIFORNIA.

PROCESS FOR PURIFYING LIQUIDS.

1,416,899.  Specification of Letters Patent.  Patented May 23, 1922.

Application filed May 10, 1920. Serial No. 380,051.

*To all whom it may concern:*

Be it known that I, CHARLES W. SIRCH, a citizen of the United States, residing at Los Angeles, in the county of Los Angeles and State of California, have invented a new and useful Process for Purifying Liquids, of which the following is a specification.

This invention relates to processes and means for purifying liquids and more particularly for purifying under pressure.

One of the objects of this invention is to provide for sedimentation within a device of this type during the passing of matter through the device.

Another object is to provide for sedimentation within a device of this type without obstructing the passing of materials and substances to be purified.

Another object is to provide for sedimentation within a device of this type without obstructing the passage through the device.

Another object is to provide for sedimentation within a device of this type under pressure without obstructing the passage through the device.

Another object is to provide for sedimentation within a device of this type without interrupting the process of purifying.

Another object is to provide for sedimentation within a device of this type under pressure without interrupting the process of purifying.

Another object is to provide for a skimming of the fluid or material or substance while passing through a device of this type for purifying purposes.

Another object is to pass the unclean fluid in and pass the clean fluid out at a low point of the device.

Other objects will appear from the following description and appended claims as well as from the accompanying drawing, in which—

Fig. 1 is a vertical midsectional view of a device, thus illustrated for the purpose of aiding in the explanation of the process set forth in the following specification.

Fig. 2 is a vertical section on line 2—2 of Fig. 1.

Fig. 3 is a horizontal section on line 3—3 of Fig. 1.

Purification can, of course, be accomplished in many different ways, and with the aid of many different devices to finally show the same result, but it is one of the main features of this invention to accomplish purification by separating heavy, light, dry, or oily or any other substances from a certain substance or material (mainly fluids), and eventually separate all such undesired substances or several of them practically at the same time or through the same operation.

To explain the process, I have illustrated in the accompanying drawing a certain device, but I wish it understood that such a device may easily be modified within the spirit of this process.

In the device in the drawing, the unclean fluid is allowed to enter the device through the tube 1 of the apparatus 2. The tube 1 enters through one wall and communicates with a distributing conduit 34 which terminates at the opposite wall within the apparatus 2, spreading the incoming charge over the whole width of the device in a practically horizontal plane. Within the device, the conduit 34 is provided with an orifice 3. From this orifice 3 the inpassing fluid or charge passes at a practically horizontal plane sidewise from the tube against the baffle 4 being thereby deflected and directed upwardly. At the uppermost point the orificial section suddenly enlarges and at the same time takes another trend, causing an expanding of the fluid and thereby a slowing down of the movement at about the point 5 which allows lighter materials and substances to come to float on the fluid; while at the same time, still having a certain speed or being under the influence of the inpassing force to a certain extent, causing some of the heavier materials and substances to be thrown in the direction of the arrow 6. A conduit or chimney 7 passes at this point upwardly. The whole device is divided into three main compartments 8, 9 and 10.

The compartment 8 can be called the main separating chamber. The compartment 9 may hereafter be called the sludge-hopper. The compartment 10 may hereafter be called the skimmings-hopper. The main separating chamber is divided from the sludge hopper by the partition 11. This partition 11 does however, not reach over the whole width of the device, being spaced from the outer wall of the device on one side at the point 12. From this point 12, a vertical partition or baffle 13 extends downwardly into the main separating chamber 8. The conduit 7 is disposed between the partitions 11 and 14 giving communication between the main separating chamber 8 and the skimmings hopper 10, since the partition 14 divides the sludge hopper 9 from the skimmings hopper 10.

The sludge hopper 9 and the skimmings hopper 10 are provided with outlets 15 and 16, preferably controlled by valves on the outside, for letting air into the device before the device is put into commission, and for controlling the trapped air when the device is in operation.

Injecting fluids or any other more solid matter into the device through the tube 1 normally causes such trapped air to become compressed when the outlets 15 and 16 are kept closed. Such trapped air then allows the fluids to rise to eventually the level 17.

A skimming is produced at about the point 18 below the conduit 7 while the inrushing fluids pass this point for the reason explained above, namely the expanding and deflecting of the passing stream. This skimming process is promoted and improved by allowing air to pass out of the outlet 15 to a very slight extent so that the trapped air may escape from the skimmings hopper 10 to be replaced by skimmings, passing upwardly through the conduit 7 into the skimmings hopper 10.

Through the expanding process at and after the point 5, sedimentation takes also place at the points 5, 18 and 19, because and on account of the slowing down of the movement of the passing stream, as will easily be understood.

Especially heavy solids descend immediately after passing over the baffle 4 at about the point 20. These heavy solids tend to carry such lighter solids as may still be contained in the fluids or liquids after these take the turn as indicated at 21 downwardly separating them from the fluids in this manner. The baffle 22 is only intended to direct the course of fluids real far downwardly before passing upwardly as indicated by the arrow 23.

From then on the fluids are permitted to rise into an enlarged section 24. Especially light substances, as oil, grease and other similar substances that may in exceptional cases still be present are allowed to collect at the top of this compartment 24 at a point indicated at 25.

The clear fluids leave the device at 26.

All sediments settle on the sloping bottom 27, this bottom being designed at an angle of repose of the sediments so that a sliding downwardly and an accumulating at the point 28 occurs, at which point the main separating chamber communicates with the sludge hopper 9.

The sludge hopper, being provided with an outlet 16, preferably controlled by a valve on the outside of the device, serves to receive more and more of the sludge and sediment as a suitable amount of air is gradually allowed to pass out of the outlet 16.

The main sludge valve 29 is provided so that the sediments may be drawn off at intervals, preferably before all the air has been used up or been allowed to pass out through the outlets 15 and 16.

In case the compressed air effect is to be kept, smaller individual sludge valves 30, 31 and 32 are provided, through which from time to time the skimmings, sediments, sludge, grease, and other substances can be drawn off and discharged, as will easily be understood.

With this and under this process all kinds of clarification and sedimentation can be accomplished.

Comparatively non-compressible fluids, such as industrial liquors, factory wastes, sewages, and other similar matter, containing or consisting of mechanical mixtures of various substances, having varying densities, or being capable of suspension in the fluids by reason of their containing gases, have heretofore been treated by slow and inefficient settling tanks, screens and similar devices exposing the fluids (often offensively) to the atmosphere.

This process naturally consists of an improved system of more rapidly and more efficiently separating, collecting, or depositing such suspended matters with or without the addition of solidifying substances and preferably with the aid of pressure.

As will be understood from the above, the fluid is introduced into a container at a point near its bottom. The fluid is then kept, under a required pressure, confined in orifices or conduits of varying cross sections designed to predetermine the velocity of the flow at given points in its course through the device in order that sedimentation, separation, or stratification of the suspended substances may take place. The direction of flow is at the same time reversed. In this manner, a mechanical quick separation of scum is secured, sedimentation of the heavier solids occurs, a sedimentation of the lighter suspended solids is obtained by reason of their being carried down by the especially heavy solids falling through the reversed current of the fluid, and finally a further clarification is secured by permitting the fluid to rise slowly in separate compartments.

When either the lighter or heavier substances are present in quantities or qualities insufficient to properly effect their separation by the above described operation, lighter oils are added to gather greases, coagulants or substances to gather fine particles are added when necessary, or heavy solids in finely or suitably divided state are added in order to carry down with them other suspended solids. Two or more of these actions may, of course, be used simultaneously, or just as may appear necessary. Such adding, or mixing, or otherwise slightly modified operation is easily accomplished manually by shoveling when operating a small device, or mechanically or automatically over chutes and conveyors of any well known type, not shown in the drawing, since any man skilled in the art may easily apply them in accordance with the process described above. The adding or mixing is normally accomplished before the matter enters the device through the tube 1.

The fluid can also be passed through bar- or wire-screens 35 placed across the path of the ascending current to catch fibrous or similar heterogeneous substances when these happen to be present. Such screen is inclined at an angle of about 60 degrees and so disposed that the operation of back-washing will remove the obstructions from the screens.

Having thus described my invention, I claim:

1. The herein described process of purifying liquids consisting in passing the unclean matter through a narrow space into a larger space over the whole width of the passing stream so as to cause a quick slowing down of the movement thereby promoting the rising of light matter and the sedimentation of heavier matter, removing the scum from the surface automatically and continuously when the stream passes a certain point by subjecting the surface to expansion over the force contained in the incoming stream, removing the sediment from the stream automatically and continuously when the stream passes a certain point by subjecting the sediment to expansion over the force contained in the passing stream, maintaining an even level in the surface of the passing stream by holding the stream continuously under pressure by the accumulating scum and sediment, and directing the cleared stream downwardly and rearwardly below the incoming stream so as to cause a dropping of especially heavy matter from the inpassing stream through the outgoing stream.

2. The herein described process of purifying liquids consisting in passing the unclean matter through a narrow space into a larger space over the whole width of the passing stream so as to cause a quick slowing down of the movement thereby promoting the rising of light matter and the sedimentation of heavier matter, removing the scum from the surface automatically and continuously when the stream passes a certain point by subjecting the surface to expansion over the force contained in the incoming stream, removing the sediment from the stream automatically and continuously when the stream passes a certain point by subjecting the sediment to expansion over the force contained in the passing stream, maintaining an even level in the surface of the passing stream by permitting the formation and maintaining of a head of scum and sediment in relation to the passing stream by providing additional space according to the accumulating scum and sediment, and directing the cleared stream downwardly and rearwardly away from the points of skimming and sedimentation below the incoming stream before passing out.

3. The herein described process of purifying liquids under pressure consisting in holding air trapped and then directing and deflecting the liquids so as to produce a skimming, sedimentation, separation, or stratification of any suspended substances in the liquids at points from which it may be allowed to replace the trapped air gradually by releasing trapped air according to the amount of such accumulating matter.

4. The herein described process of purifying liquids under pressure consisting in holding air trapped and then bringing liquids to be purified against the head of air thereby compressing the trapped air above the incoming liquids so as to allow waste separated from the liquids to be drawn away from the liquids on releasing trapped air according to such incoming waste.

5. The herein described process of purifying liquids under pressure consisting in trapping air; forcing liquids to be filtered against the head of trapped air; producing skimming, sedimentation, separation, and stratification at points from which such matter can be drawn off and removing such matter from such points without obstructing the passage of the liquids.

6. The herein described process of purifying liquids under pressure consisting in directing and deflecting the liquids, giving speed to the movements and slowing down such movements at different points so as to produce scum and sediment at points out of the passing current, trapping air so as to be in commmunication with the space where the stream passes at points where such scum or sediment becomes located, and removing such scum and sediment without obstructing the passage of the filtering stream by releasing the trapped air.

7. The herein described process of purifying liquids under pressure consisting in controlling the movement of liquids so as to produce a skimming and sedimentation at predetermined points against a head of trapped air, adding matter for promoting and helping to carry down suspended solids in the liquids, reversing the direction of liquids so that the outgoing stream passes below the incoming stream so that the heavier suspended solids falling from the incoming stream will carry lighter solids and matter down through the outgoing stream thereby also detaining matter still contained in the outgoing stream, and screening the outgoing stream so as to prevent any such falling matter from coming into the outgoing passage.

In testimony that I claim the foregoing as my invention I have signed my name in the presence of two subscribing witnesses.

CHARLES W. SIRCH.

Witnesses:
JOHN C. STICK,
MAUD WILSON.